Oct. 25, 1966 E. SENNHENN 3,281,530

CIRCUIT ARRANGEMENT FOR ADJUSTING THE BLACK LEVEL OF A VIDEO SIGNAL

Filed Feb. 25, 1963 3 Sheets-Sheet 1

Inventor:
Emil Sennhenn
by Michael S. Striker
Attorney

Jnventor:
Emil Sennhenn
by Michael S. Striker
Attorney

Inventor:
Emil Sennhenn
by Michael S. Striker
Attorney

United States Patent Office 3,281,530

Patented Oct. 25, 1966

3,281,530

CIRCUIT ARRANGEMENT FOR ADJUSTING THE BLACK LEVEL OF A VIDEO SIGNAL

Emil Sennhenn, Darmstadt-Arheilgen, Germany, assignor to Fernseh G.m.b.H., Darmstadt, Germany Filed Feb. 25, 1963, Ser. No. 260,391
Claims priority, application Germany, Feb. 24, 1962, F 36,115
6 Claims. (Cl. 178—7.1)

Figure 1:
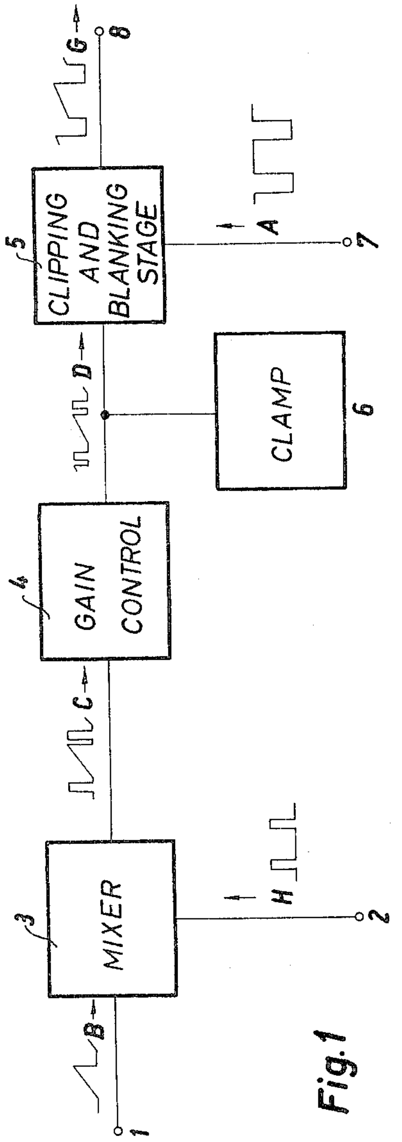

The present invention relates to a circuit arrangement for adjusting the black level of a video signal. This video signal is composed of picture signal components and blanking signal components and its overall amplitude shall remain constant during the process of adjustment.

In a known circuit arrangement the black level and the clipping level of a composite video signal are adjusted by means of a first potentiometer. The amplitude of the clipped video signal is controlled by means of another potentiometer. These two potentiometers are mechanically coupled in order to obtain an approximately constant peak amplitude of the composite video signal even when the black level of the video signal is altered. In particular when the black level is raised the amplification of the picture signal is reduced by means of a gain control circuit in order to compensate for this change.

This known circuit arrangement has the disadvantage that the peak amplitude can't be held constant exactly due to the different control characteristics of the two potentiometers and the associated control circuits. Further disadvantages of this known circuit arrangement are that special potentiometers must be employed to produce mutually compensating control characteristics and that a tedious and time-consuming process of alignment of several padding and trimming resistors associated with these potentiometers is usually necessary. This known apparatus also has a further disadvantage that the output signal of the clipping stage usually has to be reduced in amplitude before being applied to the gain control circuit, which is able to handle only a signal of relatively small amplitude if good linearity (small differential amplitude distortion) is to be assured.

It is an object of the present invention to provide a circuit arrangement for adjusting the black level of a video signal in which the disadvantages of known apparatus shall be avoided.

It is another object of the present invention to provide a novel circuit arrangement holding the overall amplitude range of a composite video signal constant and independent of the potential to which the black level may be adjusted.

It is still a further object of the present invention to provide a circuit arrangement for adjusting the black level of a video signal by means of a gain control circuit.

It is another object of the present invention to provide a circuit arrangement for adjusting the black level of a video signal not requiring time-consuming alignment operations.

According to the present invention there is provided a circuit arrangement for adjusting the black level of a composite video signal composed of picture signal components and blanking components, comprising in combination means for generating auxiliary pulses repetitive at the line repetition rate of said video signal and occurring during said blanking components, said auxiliary pulses being of the same polarity as said picture signal components and having an amplitude equal to the nominal signal amplitude of said picture signal components; a mixer stage fed with said composite video signal and with said auxiliary pulses to yield a further composite video signal containing said auxiliary pulses; a gain control circuit fed with said further composite signal and having its output applied by way of a clamped D.C. restoring device to a blanking stage in which further blanking impulses are added to said further composite signal to yield a re-blanked composite signal and a clipping stage, fed with said re-blanked composite signal, of which the clipping level is fixedly related to that level at which the D.C. level of said further composite signal is clamped by said D.C. restoring device.

In some embodiments of apparatus according to the invention it will be undesirable to mix the auxiliary pulses with the picture signal immediately before the blanking stage. Instead, a number of other stages or signal channels may intervene between the control circuit and the blanking stage. If, as is usual, these intervening circuits are to include black-level control stages, when it is desirable, in accordance with an extension of the invention, for the further composite video signal to be applied to a further mixer stage in which there are added to it counter-pulses of the same amplitude as the auxiliary pulses having an amplitude equal to the nominal signal amplitude of the picture signal components, but of opposite polarity thereto. The direct current component of this modified composite signal is then clamped by a gated reference-level clamp circuit operating on the tops of the counter-pulses and thereafter applied to the blanking and clipper stages.

Figure 2:
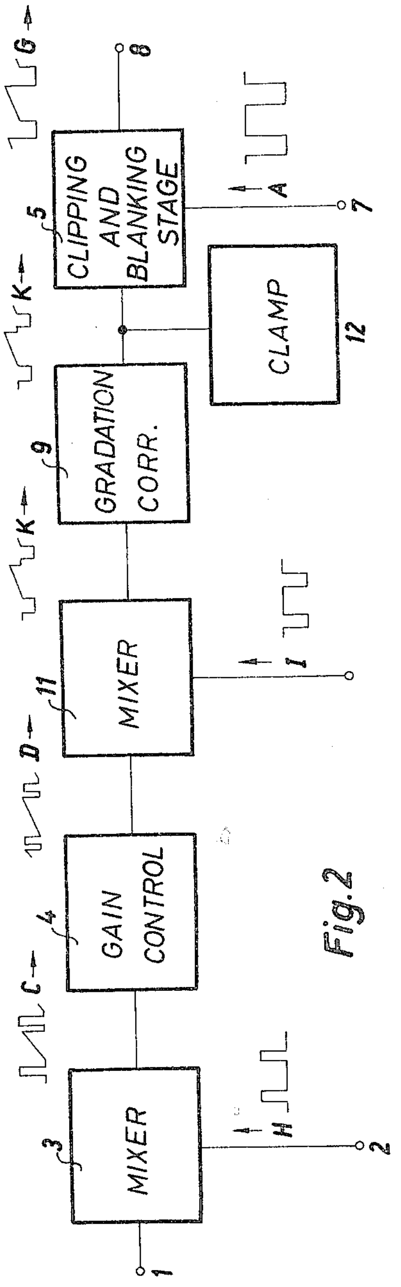
Figure 3:
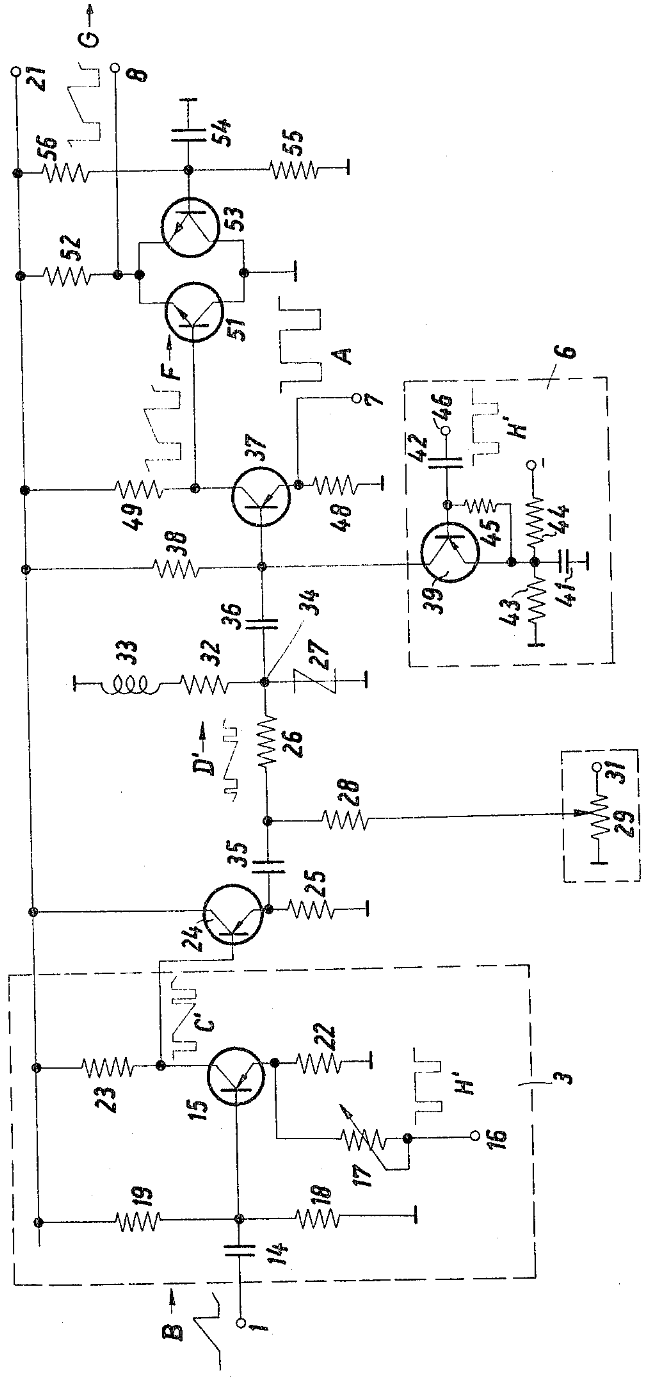
Figure 4:
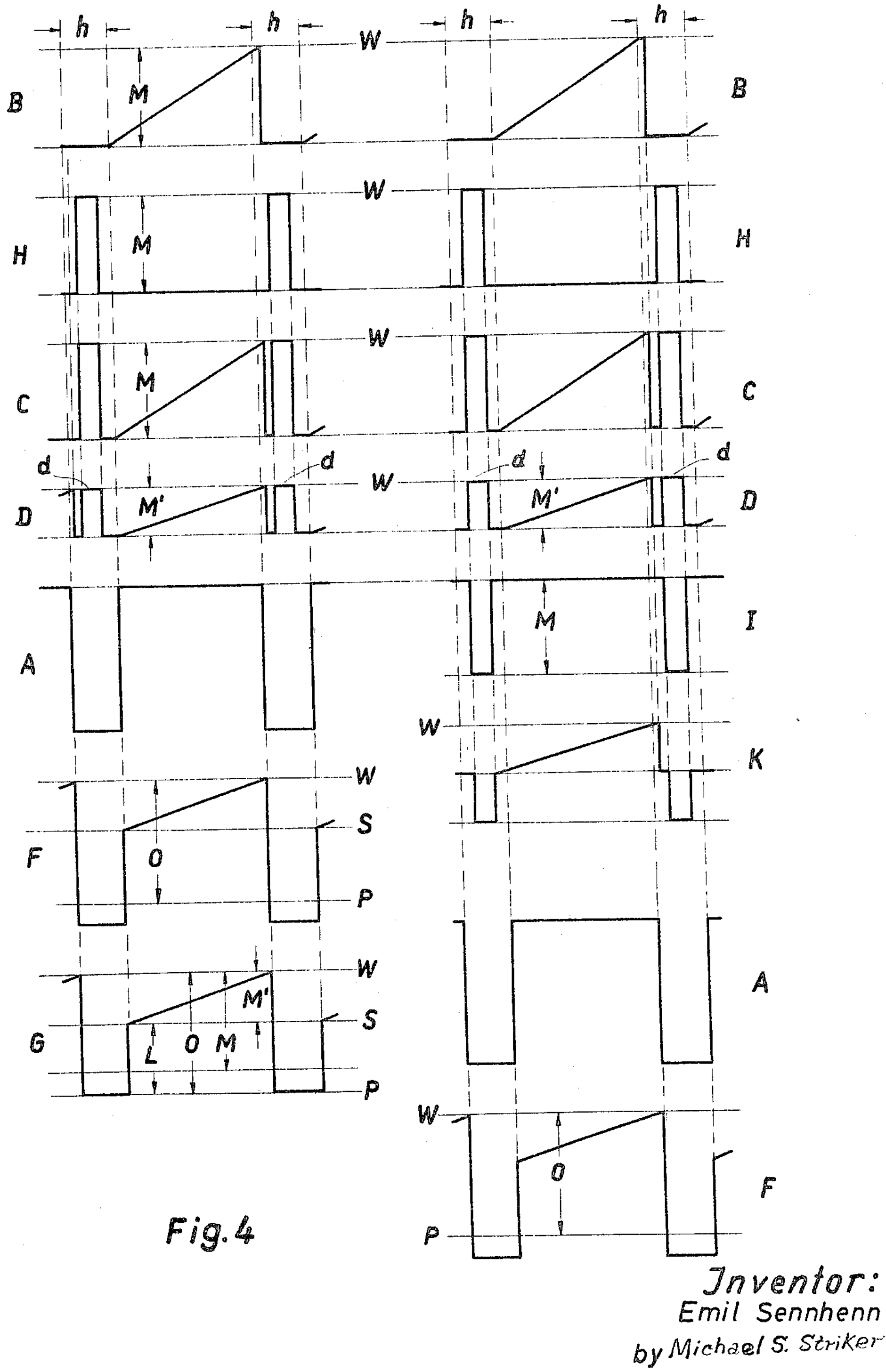

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIGURE 1 is a block schematic diagram illustrating one embodiment of apparatus according to the invention, FIGURE 2 is a block schematic diagram illustrating a further embodiment of the present invention, FIGURE 3 is a circuit diagram of a particular embodiment of apparatus as described in relation to FIGURE 1, FIGURE 4 is a series of waveform diagrams illustrating signals which arise in apparatus as described in relation to FIGURES 1, 2 and 3.

In all the figures, corresponding elements are designated by the same reference symbols.

FIGURE 1 shows a circuit arrangement for adjusting the black level of a composite video signal, shown at G in FIGURE 4, which is composed of picture signals and blanking signals. In order to show more clearly the range of amplitudes occupied by this picture signal, it is represented in FIGURE 4 as being a test signal of linearly increasing amplitude.

The blanked video signals B are applied to the circuit arrangement of FIGURE 1 by way of input terminal 1, while auxiliary pulses H are applied to the circuit by way of input terminal 2. Both these signals are applied to a mixer circuit 3 in which they are additively combined to yield the output signal C. The further composite video signal C thus produced is applied to a gain control circuit 4, in which the signal amplitude may be varied at will over a substantial range, as indicated by waveform D in FIGURE 4, where the signal amplitude M' no longer corresponds to the nominal amplitude M indicated in waveforms B, H and C.

The output signal from the gain control circuit 4 is applied to a blanking and clipping stage 5, the direct current component of the input signal to stage 5 being clamped by a pulse-operated clamping stage 6 the driving pulses for which are so timed that the clamp operates on the tops *d* of the injected auxiliary pulses. Blanking pulses as illustrated by waveform A are applied by way of input terminal 7 to the blanking circuit in stage 5 where they are combined with the input signal to yield a re-blanked composite signal as illustrated by waveform F of FIGURE 4 and this re-blanked signal is then clipped at a predetermined level P which has a predetermined relation to the level at which signal F has been stabilized by the clamp circuit 6. The final signal G is fed out from blanking and clipping stage 5 by way of output terminal 8.

If the mixture of the picture signal B with the auxiliary pulses H and the adjustment of the black level by the gain control circuit are not to be effected immediately before the signal enters the blanking and clipping stage, then it is preferred to employ a circuit arrangement as illustrated in FIGURE 2. According to FIGURE 2 in the signal channel between the gain-control circuit 4 and the blanking and clipping stage 5 is connected a further stage 9, which may in fact comprise a number of circuit devices, the nature of which does not concern the present invention. For instance this stage 9 may be a gradation correction circuit which does not alter the amplitude M' (FIG. 4) of the signal D. In this embodiment of the invention a further mixer stage 11 is provided immediately subsequent to the gain control circuit 4, in which there are added to the output signal D from circuit 4, a series of counter-pulses shown at I in FIGURE 4, of which the amplitude corresponds to the nominal picture signal amplitude M but of which the polarity is opposite to that of the auxiliary pulses H. These counter-pulses I are timed to coincide with the auxiliary pulses H.

The signal, illustrated by waveform K is applied to the intervening stage 9, from which it may be assumed to emerge as a signal with equal amplitude. The output signal from stage 9 is applied to the input of the blanking and clipping stage 5, in which as before it is combined with blanking signals A to yield the signal shown at F (FIG. 4) and then clipped at a predetermined level P to yield the output signal G. The input signal to blanking stage 5 is again clamped by a pulse-driven clamp 12 which operates on the pulse tips of the counter-pulses I.

The circuit arrangements described above in relation to FIGURES 1 and 2 thus make possible an optional adjustment of the black level in a composite video signal of predetermined amplitude O, which remains constant no matter what the value to which the lift or pedestal L is adjusted.

In the circuit arrangement shown in FIGURE 3, which is a practical embodiment of a circuit as described in relation to FIGURE 1, the picture signal B is received at an input terminal 1, whence it is applied to a mixer 3. In mixer 3 the video signal is applied by way of a capacitor 14 (50 μf.) to the base of a transistor 15 (Type AF 118) and is mixed with auxiliary pulses H' (the addition of the prime (') to the letter designating merely a reversal of polarity from that illustrated in FIGURE 4), which are applied to its emitter by way of terminal 16 and a resistor 17 by which their amplitude may be adjusted as necessary. The base potential of transistor 15 is determined by resistors 18 (2.7KΩ) and 19 (18KΩ) by which the base is returned to the positive and negative terminals respectively of the working voltage, which may conveniently be 12 volts. Transistor 15 has an emitter resistor 22 (330Ω) across which appear the auxiliary pulses applied by way of resistor 17 while the mixed auxiliary pulses and video signals appear across a collector load resistor 23 (680Ω). These signals of waveform C' are applied to the base of an emitter-follower transistor 24 (Type AF 118), from the emitter resistor 25 (1.8KΩ) of which it is passed to the gain-control circuit.

The gain control circuit here employed consists essentially of a voltage divider formed by a resistance 26 (82Ω) and a voltage-dependent resistor 27 (Type E 299 DD/P 118), to which the signal from the emitter of transistor 24 is applied by way of a coupling capacitor 35 (250 μf.). A resistor 28 (120Ω) connected to the junction of coupling capacitor 35 with resistor 26 has its bottom end connected to the slide tap of a potentiometer 29 (1KΩ) of which one terminal is connected to ground (that is to the positive terminal of the working voltage), while the other terminal is connected to a —20 volt source. Varying the state of adjustment of potentiometer 29 varies the bias voltage applied to the voltage divider and hence the effective resistance of voltage-dependent resistor 27 and thus the ratio of the voltage divider. In parallel with voltage-dependent resistor 27 there is connected the series combination of a resistor 32 (180Ω) and an inductor 33 (2.5 μh.), the effect of which is to reduce the change of effective resistance of voltage-dependent resistor 27 with frequency.

There thus results at the tap 34 of voltage divider 26/27 the signal D', the amplitude of which may be adjusted as desired by operation of the potentiometer 29. The signal appearing at point 34 is passed on by way of coupling capacitor 36 (0.1 μf.) to the base of a transistor 37 (Type AF 118). The potential of this base is determined by a pulse-driven clamping stage 6. This clamping stage comprises a transistor 39 (2 FA 17), having its collector connected to the base of transistor 37 and thence by way of a resistor 38 (1MΩ) to the negative supply. To the base of transistor 39 there are applied by way of terminal 46 and capacitor 42 (0.1 μf.) negative-going drive pulses H', of which the timing is identical with that of the auxiliary pulses H' injected into the signal mixer 3. During these drive pulses, transistor 39 is conductive, so that the potential at the base of transistor 37 becomes substantially equal to that at the emitter of transistor 39; this potential is determined by resistors 43 (2.7KΩ) and 44 (15KΩ). The emitter of transistor 39 is decoupled to ground by way of a capacitor 41 (0.1 μf.) and the base of this transistor is returned by way of a resistor 45 (47KΩ) to the emitter.

To the emitter of transistor 37 blanking pulses A are applied by way of terminal 7, appearing across emitter resistor 48 (330Ω). There thus appears across the collector load resistor 49 (680Ω) of transistor 37 the re-blanked composite signal F, which is applied to the base of a transistor 51 (n-p-n transistor Type 2N697). The emitter and collector of the transistor 51 are connected in common with those of another n-p-n transistor 53 (Type OC141), the collectors being grounded, while the emitters are taken to the negative supply line by way of a common load resistor 52 (1KΩ). The base of transistor 53 is held at a predetermined potential P (FIG. 4) by means of resistors 55 (2.2KΩ) and 56 (680Ω), through which it is returned to the positive and negative supply terminals respectively while it is decoupled to ground through capacitor 54 (5 μf.). This circuit arrangement clips the applied signal at level P, thus yielding at terminal 8 the output signal G.

If the potential of the re-blanked composite signal F shifts to more negative values, then the emitter of transistor 53 becomes more negative with respect to its fixed base bias, so that the emitter-collector path of transistor 53 becomes conductive when the reference potential P is reached. The low impedance then offered by the emitter-collector path of transistor 53 clamps the emitter of transistor 51, so that signals more negative-going than potential P are clipped off.

The circuit arrangements described above in relation to the drawings can be employed at many different positions in the signal channel between a video signal source, such as a television camera or magnetic recording equipment, and the studio outlet. The video signal composed of picture signals and blanking signals may, for example, be developed by an image-orthicon or vidicon television camera or by a film scanner. The blanking component of the signal may thus arise either from the particular mode of operation of the picture signal source or as a result of the addition of blanking impulses and subsequent clipping in the transmission channel between the picture signal source and the input of apparatus according to the invention.

While the invention has been illustrated and described as embodied in a circuit arrangement for adjusting the black level and holding constant the overall amplitude range of a composite video signal it is not intended to be limited to the details shown, since various modifications and structural changes may be made without departing in any way from the spirit of the present invention.

What is claimed as new and desired to be secured by Letters Patent is:

1. A circuit arrangement for adjusting the black level of a composite video signal and a circuit device, said composite video signal being composed of picture signal components having a black-white transition including a nominal level and blanking components, comprising, in combination, means for generating auxiliary pulses repetitive at the line repetition rate of said video signal and occurring during said blanking components, said auxiliary pulses being of the same polarity as said picture signal components and having an amplitude equal to the nominal level of the black-white transition of said picture signal components; a first mixer stage additively combining two input signals applied to its two input leads respectively; connection means applying said composite video signal and said auxiliary pulses to said input leads respectively of said first mixer stage producing a further composite video signal available at the output lead of said first mixer stage; a gain control circuit; connection means applying said further composite video signal to the input lead of said gain control circuit; a second mixer stage additively combining two signals applied to its two input leads respectively; a pulse generator generating a train of counter-pulses coincident in time with said auxiliary pulses but of opposite polarity and of an amplitude corresponding to the nominal level of the black-white transition of said picture signal components; connection means applying the output signals of said gain control circuit and said pulse generator to said input leads respectively of said second mixer stage; a clamped D.C. restoring device; a blanking stage adding blanking pulses to a signal applied to its input lead; connection means applying the output signal of said second mixer stage via said circuit by way of said clamped D.C. restoring device to said blanking stage producing a re-blanked composite video signal; a clipping stage having its clipping level fixedly related to that level at which the D.C. level of said output signal of said second mixer stage is clamped by said D.C. restoring device; connection means applying said re-blanked composite video signal to said clipping stage.

2. A circuit arrangement for adjusting the black level of a composite video signal as claimed in claim 1 wherein said clamped D.C. restoring device comprises a generator producing driving pulses timed so that said clamped D.C. restoring device operates on the tops of said counter-pulses.

3. A circuit arrangement for adjusting the black level of a composite video signal as claimed in claim 2, wherein said gain control circuit varies the amplitude of a signal and comprises an input lead, an output lead; a voltage divider having two ends and a tapping point, said voltage divider comprising a resistor and a voltage-variable resistor connected in series relative to said signal via said tapping point; means for applying to said voltage divider a variable bias potential for varying the effective value of said voltage-dependent resistor; connection means connecting the input lead of said gain control circuit to one of the ends of said voltage divider; and connection means connecting said tapping point to the output lead of said gain control circuit.

4. A circuit arrangement for adjusting the black level of a composite video signal as claimed in claim 2, wherein said clipping stage comprises a supply voltage having two terminals; two transistors each having emitter, collector and base electrodes, said transistors having their collectors and emitters connected in common, one pair of said collectors and emitters being connected by way of a resistor to a terminal of said supply voltage; connection means connecting the other pair of said collectors and emitters to the other terminal of said supply voltage; connection means applying the signal to be clipped to the base of one of said transistors; a source of predetermined clipping potential; connection means connecting the base of the other one of said transistors to said source of predetermined clipping potential.

5. Method for adjusting the black level of a composite video signal composed of picture signal components having a black-white transition including a nominal level and blanking components, comprising, in combination, the steps of generating auxiliary pulses repetitive at the line repetition rate of said video signal and occurring during said blanking components, said auxiliary pulses being of the same polarity as said picture signal components and having an amplitude equal to the nominal level of the black-white transition of said picture signal components; mixing said composite video signal and said auxiliary pulses to yield a further composite video signal containing said auxiliary pulses; adjusting the gain of said further composite video signal; generating counter-pulses being of the same amplitude as the auxiliary pulses and having an amplitude equal to the nominal level of the black-white transition of the picture signal components, but of opposite polarity thereto; mixing said adjusted further composite video signal and said counter-pulses and producing a modified composite video signal; transmitting this modified composite video signal via intervening circuits and restoring its D.C. component; mixing said modified composite video signal with blanking pulses to yield a re-blanked composite video signal; clipping the level of said re-blanked composite video signal to a fixed overall amplitude.

6. A method for adjusting the black level of a composite video signal as claimed in claim 5, comprising the step of restoring the D.C. component of said composite video signal by using driving pulses operating on the tops of said counter-pulses.

References Cited by the Examiner

UNITED STATES PATENTS

| | | | |
|---|---|---|---|
| 2,910,531 | 10/1959 | Fathaver | 178—7.3 |
| 2,913,522 | 11/1959 | Loughlin | 178—7.3 |
| 3,217,100 | 11/1965 | Voeckler | 178—7.1 |

OTHER REFERENCES

Luther, A. C., Jr.: "Image Orthicon Automatic Beam and Gain Control," R.C.A. Technical Note, No. 389, June 1960.

DAVID G. REDINBAUGH, *Primary Examiner.*

J. McHUGH, *Assistant Examiner.*